United States Patent [19]
Duggan

[11] Patent Number: 5,452,957
[45] Date of Patent: Sep. 26, 1995

[54] CENTER BEARING ASSEMBLY INCLUDING SUPPORT MEMBER CONTAINING RHEOLOGICAL FLUID

[75] Inventor: James A. Duggan, Temperance, Mich.

[73] Assignee: Dana Corporation, Toledo, Ohio

[21] Appl. No.: 343,180

[22] Filed: Nov. 22, 1994

[51] Int. Cl.⁶ ............................................. F16C 27/04
[52] U.S. Cl. ..................... 384/99; 384/535; 384/536
[58] Field of Search .................. 384/99, 535, 536, 384/581, 582, 8

[56] References Cited

U.S. PATENT DOCUMENTS

| | | | |
|---|---|---|---|
| 4,392,694 | 7/1983 | Reynolds | 384/536 |
| 4,867,655 | 9/1989 | Barbic et al. | 384/535 |
| 4,921,229 | 5/1990 | Hori | 384/536 |
| 5,380,100 | 1/1995 | Yu | 384/99 |

*Primary Examiner*—Lenard A. Footland
*Attorney, Agent, or Firm*—MacMillan, Sobanski & Todd

[57] ABSTRACT

A center bearing assembly includes a roller bearing adapted to receive and rotatably support a coupling shaft and a bracket adapted to be secured to a vehicle frame. A support member is provided which supports the roller bearing within the bracket. The support member includes a bladder formed of an elastomeric material. The bladder contains a rheological fluid which exhibits a significant change in its ability to flow or shear upon the application of an appropriate energy field. Preferably, the bladder contains a magneto-rheological magnetic fluid. By varying the power supplied to an electromagnet located adjacent the bladder, the vibration dampening characteristics of the support member may be varied depending upon the operating conditions of the vehicle.

19 Claims, 2 Drawing Sheets

CENTER BEARING ASSEMBLY INCLUDING SUPPORT MEMBER CONTAINING RHEOLOGICAL FLUID

BACKGROUND OF THE INVENTION

The invention relates in general to bearings for supporting shafts for rotation and in particular to an improved structure for a center bearing assembly for rotatably supporting an intermediate portion of a vehicle drive line or coupling shaft assembly.

In most rear wheel drive vehicles, a source of rotational energy, such as an internal combustion or diesel engine, is located near the front of the vehicle. The engine is connected by means of a drive line to rotate one or more driven wheels located near the rear of the vehicle. The drive line typically extends between a transmission, which is connected to the engine, and a differential, which is connected to the driven wheels. In some vehicles, the distance separating the transmission and the differential is relatively short. In these vehicles, the drive line is composed of a single tube, usually referred to as the drive shaft. In other vehicles, the distance separating the transmission and the differential is relatively long, making the use of a single drive shaft impractical. In these vehicles, the drive line is composed of a drive shaft and one or more coupling shafts. The coupling shafts are connected to the drive shaft (and to each other) by universal joints.

Drive lines which are composed of a drive shaft and one or more coupling shafts require the use of one or more intermediate resilient support structures, which are generally referred to as center bearing assemblies. A typical center bearing assembly includes an annular roller bearing within which the coupling shaft is rotatably supported. The roller bearing itself is disposed within a generally annular resilient support member. The resilient support member is, in turn, disposed within a relatively rigid, generally U-shaped bracket which is secured to the lower surface of a cross member extending between the side rails of the vehicle frame.

The resilient support member is provided to reduce vibrations of the drive line in the vicinity of the center bearing assembly and to prevent such vibrations from being transmitted to the vehicle frame. In the past, the resilient support member has been formed from an elastomeric material, such as rubber. Under most vehicle operating conditions, known rubber support members are effective in substantially reducing the transmission of vibrations from the drive line to the vehicle frame. However, the vibration dampening characteristics of such known support members, which depend upon the specific material and the particular configuration thereof, remain constant regardless of the vehicle operating conditions. Accordingly, the vibration dampening characteristics of known support members can be optimized only for a single set of operating conditions. The vibrations generated by the drive line, on the other hand, constantly change with changes in the operating conditions of the vehicle. As a result, these support members may not provide optimum vibration dampening of vibrations under varying operating conditions. It would, therefore, be desirable to provide an improved structure for a center bearing assembly which includes a support member having vibration dampening characteristics which can be adjusted in accordance with the changing operating conditions of the vehicle.

SUMMARY OF THE INVENTION

The invention relates to a center bearing assembly adapted to rotatably support a rotatable shaft on a vehicle frame. The center bearing assembly includes an annular roller bearing, which is adapted to receive and rotatably support the rotatable shaft, and a bracket which adapted to be secured to the vehicle frame. A support member is provided which supports the roller bearing within the bracket. The support member includes a bladder which is formed of an elastomeric material and which contains a rheological fluid. The term "rheological fluid" is used herein to describe any fluid which exhibits a significant change in its ability to flow, or shear, upon the application of an appropriate energy field, such as electrical or magnetic fields. Thus, the novel construction of the invention provides an effective center bearing assembly support member having vibration dampening characteristics which may be varied with the changing operating conditions of the vehicle.

Various objects and advantages of this invention will become apparent to those skilled in the an from the following detailed description of the preferred embodiment, when read in light of the accompanying drawings.

DETAILED DESCRIPTION OF THE PREFERRED EMBODIMENT

Figure 1:
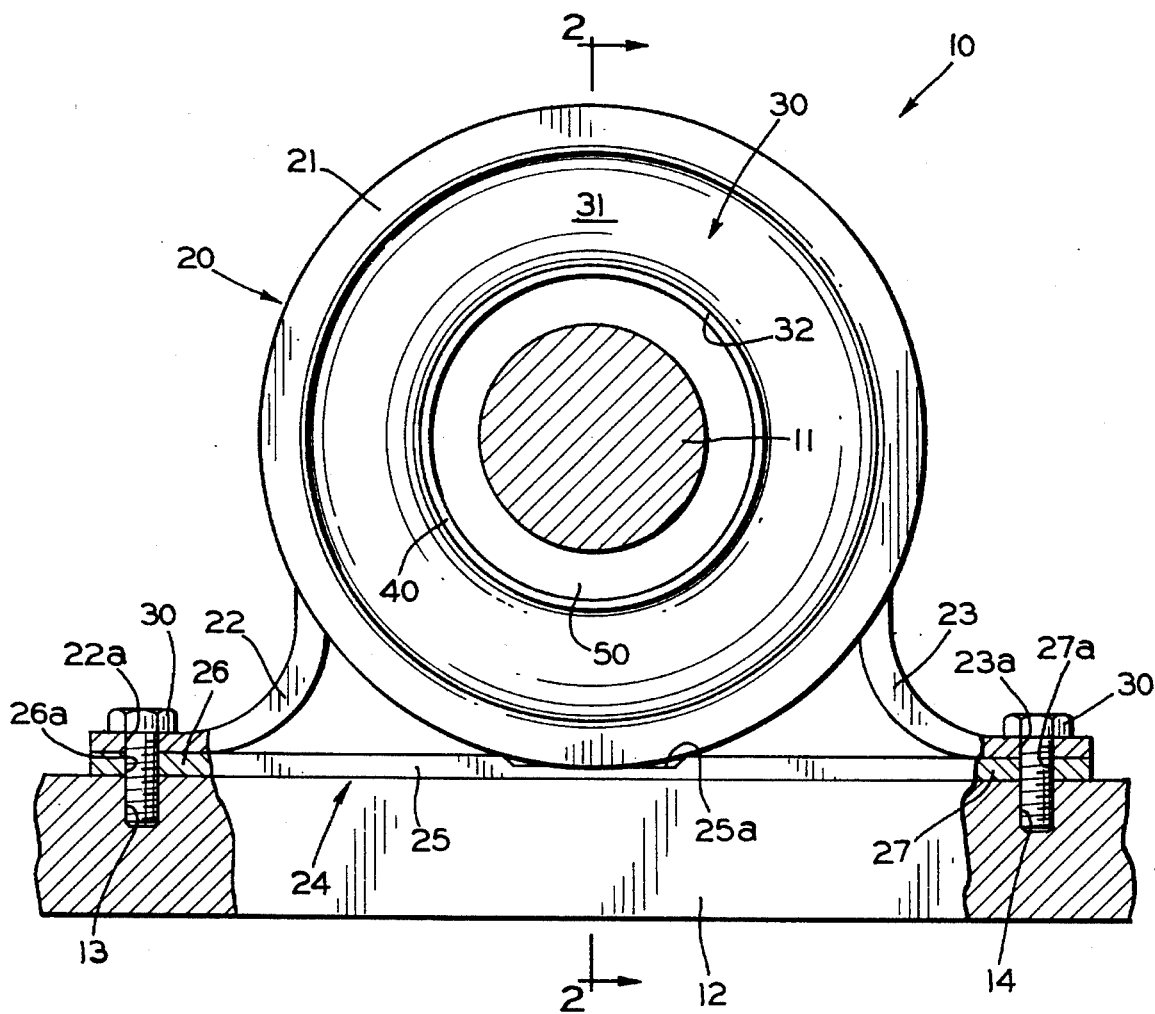
FIG. 1 is a front elevational view of a center bearing assembly in accordance with this invention.
Figure 2:
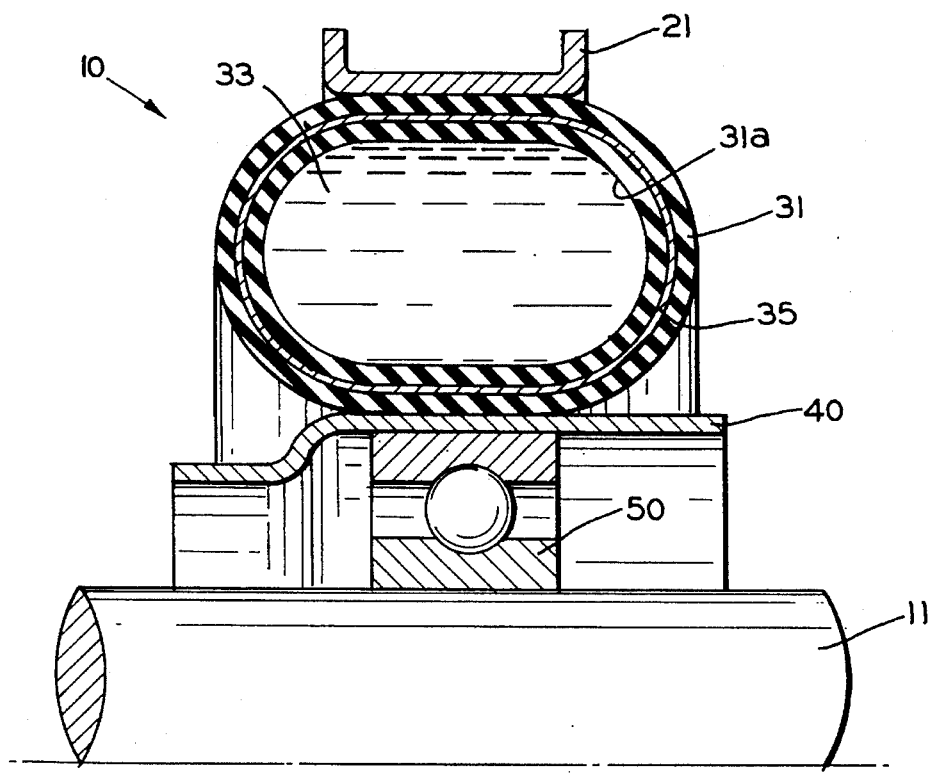
FIG. 2 is a cross sectional view of the center bearing assembly taken along the line 2—2 of FIG. 1.

Referring now to the drawings, there is illustrated in FIGS. 1 and 2 a center bearing assembly, indicated generally at 10, in accordance with this invention. As is well known in the art, the center bearing assembly 10 is adapted to rotatably support a rotatable shaft 11 or similar component of a multiple piece vehicle drive line on the lower surface of a cross member 12 or other portion of a frame for a vehicle. To accomplish this, the cross member 12 is formed having a pair of threaded apertures 13 and 14 for securing the center bearing assembly 10 thereto, in a manner which will be described in detail below. The general structure and operation of the center bearing assembly 10 is well known in the art and, for the sake of brevity, will not be discussed in detail herein. U.S. Pat. No. 4,392,694 to Reynolds, owned by the assignee of this invention, discloses the general structure and operation of center bearing assemblies, and the disclosure thereof is incorporated herein by reference.

The center bearing assembly 10 includes a bracket, indicated generally at 20. The bracket 20 includes a generally annular body portion 21 and a pair of opposed, outwardly extending leg portions 22 and 23. As best shown in FIG. 2, the body portion 21 of the bracket 20 is preferably formed having a substantially U-shaped cross sectional shape for providing strength thereto. The leg portions 22 and 23 may be formed integrally with the body portion 21 as shown, or alternatively may be secured to the body portion 21 by welding or any other suitable method. Respective apertures 22a and 23a are formed through the ends of the leg portions 22 and 23. The apertures 22a and 23a formed through the leg portions 22 and 23 of the bracket 20 are spaced apart from one another by the same distance as the apertures 13 and 14 formed in the cross member 12. Thus, as will be explained in detail below, the apertures 22a and 23a can be aligned with the apertures 13 and 14 to permit the bracket 20 to be secured to the cross member 12 of the vehicle frame.

A reinforcing bar 24 is disposed between the bracket 20 and the cross member 12. The reinforcing bar 24 includes a central body portion 25 and a pair of end portions 26 and 27. The central body portion 25 is formed having a 25 recess 25a, within which a portion of the annular body portion 21 of the bracket 20 extends. Respective apertures 26a and 27a are formed through the end portions 26 and 27 of the reinforcing bar 25. The apertures 26a and 27a formed through the reinforcing bar 25 are spaced apart from one another by the same distance as the apertures 13 and 14 formed in the cross member 12. Thus, the apertures 26a and 27a can be aligned with the apertures 22a and 23a and with the apertures 13 and 14 to permit the bracket 20 to be secured to the cross member 12 of the vehicle frame by suitable threaded fasteners 30. The threaded fasteners 30 extend through the aligned apertures 22a, 26a, and 13 and through the aligned apertures 23a, 27a, and 14 to secure the bracket 20 and reinforcing bar 24 to the cross member 12.

The center bearing assembly 10 further includes a support member, indicated generally at 30. As best shown in FIG. 2, the support member 30 is embodied as a bladder 31 formed from a flexible elastomeric material. The bladder 31 is generally annular in shape, having an outer circumferential surface which is secured to an inner circumferential surface of the body portion 21 of the bracket 20. The bladder 31 may be molded directly to the bracket 20, or may be secured thereto in any other suitable manner, such as with an adhesive. The inner circumferential surface of the bladder 31 defines an enlarged axially extending opening 32 formed through the center thereof, the purpose of which will be explained below. An annular cavity 31a is defined within the bladder 31. The annular cavity 31a of the bladder 31 is filled with a suitable rheological fluid 33.

As mentioned above, the term "rheological fluid" as used herein refers to a fluid which exhibits a significant change in its ability to flow or shear upon the application of an appropriate energy field. In the preferred embodiment, the rheological fluid is a magneto-rheological (MR) fluid, which is responsive to the presence of a magnetic field for changing is ability to flow or shear. MR fluids are formed of magnetizable particles, such as carbonyl iron, in a fluid carrier, such as a silicone oil. When exposed to a magnetic field, the particles align and reduce the ability of the fluid to flow. The shear resistance of the MR fluid is a function of the magnitude of the applied magnetic field. MR fluids are preferred for use in this invention because they are capable of generating relatively high fluid shear stresses and can be controlled using power supplies which are normally available in vehicles. TRW MR fluid, which is commercially available from TRW, Inc., is an example of one known rheological fluid which has been found suitable for use in this invention. However, other rheological fluids can also be used in accordance with this invention. For example, electro-rheological (ER) fluids, which are responsive to the presence of an electrical field (such as voltage) may also be used.

Means are provided for selectively generating and applying an energy field to the rheological fluid. The specific nature of this means will depend upon the particular type of rheological fluid is selected for use. In the preferred embodiment, where the rheological fluid is an MR fluid, the means for selectively generating an energy field can include one or more electromagnetic coils 35 provided proximate the bladder 32 containing the MR fluid 33. The electromagnetic coils 35 may be arranged in any manner such that when energized, a magnetic field is applied to the MR fluid 33. The electromagnetic coils 35 are preferably arranged so that the applied magnetic field is generally uniform over the interior of the bladder 32 containing the MR fluid 33. The electromagnetic coils 35 are preferably circumferentially embedded in or otherwise supported on the support member 30. The coils 35 are connected to a power supply through electrical conductors (not shown). By varying the magnitude of the power supplied to the electromagnetic coils 35, the strength of the magnetic field applied to the MR fluid 33 can be varied. As a result, the resistance to flow or shear of the MR fluid 33, which affects the vibration dampening characteristics of the support member 30, can be varied. The means by which the power supplied to the electromagnetic coils 35 is controlled is described below.

An annular bearing seat 40 is secured within the central opening 31a of the bladder 31. The bladder 31 may be molded directly to the bearing seat 40, or may be secured thereto in any other suitable manner, such as with an adhesive. An annular roller bearing 50 is mounted in the bearing seat 40. The roller bearing 50 is typically a ball type roller bearing, but may be any suitable antifriction bearing. One end of the rotatable shaft 11 of the vehicle drive line is received and rotatably supported in the roller bearing 50.

Figure 3:
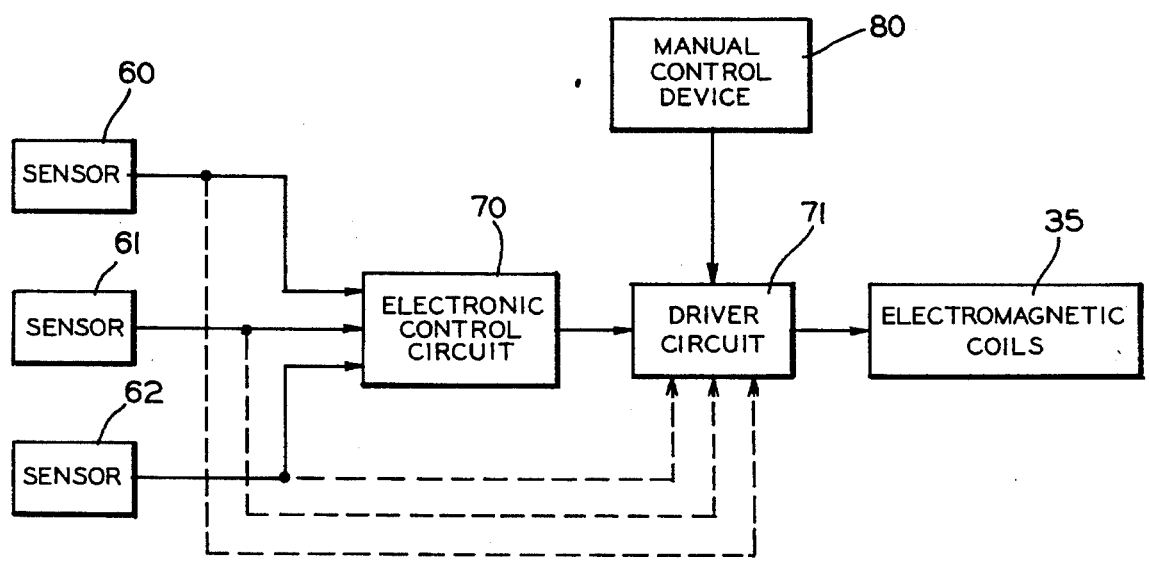
FIG. 3 is a block diagram of a control system for the center bearing assembly illustrated in FIGS. 1 and 2.

As mentioned above, by varying the magnitude of the power supplied to the electromagnetic coils 35, the vibration dampening characteristics of the support member 30 can be changed. Such changes are preferably effected in response to a change in one or more of the operating conditions of the vehicle. To accomplish this, sensors are provided for sensing one or more operating conditions of the vehicle. Referring to FIG. 3, it can be seen that a plurality of sensors 60, 61, and 62 can be provided for monitoring the status of the vehicle operating conditions and for generating electrical signals which are representative thereof. For example, some of the vehicle operating conditions which can be monitored by the sensors 60, 61, and 62 can include vehicle speed, vehicle acceleration, rotational speed of the shaft 11, angular displacement of the shaft 11, radial acceleration of the center bearing 50, axial acceleration of the center bearing 50, radial displacement of the center bearing 50, and axial displacement of the center bearing 50. If desired, however, other operating conditions of the vehicle may also be sensed and used to control the vibration dampening characteristics of the support member 30.

Each of the sensors 60, 61, and 62 is connected to an electronic circuit 70. The electronic control circuit 70, which may be embodied as any conventional microprocessor or similar computing device, is programmed to continuously read the electrical signals from the sensors 60, 61, and 62 and to generate an electrical control signal in response to a pre-programmed algorithm. The algorithm used by the electronic control circuit 70 can be easily derived using known vibration data or by testing on the vehicle. In the simplest embodiment of the invention, a single sensor 60 is used to monitor a single vehicle operating condition. By measuring the amount of vibration which is generated for given value of the sensed operating condition, a look-up table can be created which correlates the value of the sensed operating condition with a value for the control signal which will minimize the generation of such vibration. The same procedure can be followed when two or more operating conditions are sensed.

The output signal of the electronic control circuit 70 is connected to a current driver circuit 71. The current driver circuit 71 is conventional in the art and is provided to convert the output signal from the controller 70 into a corresponding electrical current. The electrical current generated by the current driver circuit 71 is fed to the electromagnetic coils 35, which generate the magnetic field in response thereto. Thus, it can be seen that the magnitude of the output signal generated by the electronic control circuit 70 determines the magnitude of the electromagnetic field generated by the electromagnetic coils 35. Consequently, the ability of the MR fluid 33 contained in the cavity 32a of the bladder 32 to flow or shear can be varied. The vibration dampening characteristics of the support member 30 can, therefore, be continuously varied according to the control algorithm and the information provided by the sensors 60, 61, and 62.

A manual control device 80 may be directly connected to the driver circuit 71. The manual control device 80 can allow the operator of the vehicle to directly adjust the magnitude of the current supplied to the electromagnetic coils 35. As a result, fine adjustment of the vibration dampening characteristics of the support member 30 is permitted to reduce or eliminate any remaining vibrations transmitted to the vehicle frame. The manual control device 80 can be embodied as a simple potentiometer or other device which, in response to manual manipulation, generates an output signal to the driver circuit 71. The manual control device 80 may be used in conjunction with the sensors 60, 61, and 62 and the electronic control circuit 70, or in lieu thereof.

Additionally, it will be appreciated that the outputs of the sensors 60, 61 and 62 may be connected directly to the driver electronics 71 as shown by the dotted lines in FIG. 3, thereby eliminating the need for the electronic control circuit 70. In this arrangement, the sensors 60, 61, and 62 can function in a manner similar to the manual control device 80 described above, wherein the output signals therefrom are used directly by the driver circuit 71 to control the magnitude of the electrical current supplied to the electromagnetic coils 35.

In accordance with the provisions of the patent statutes, the principle and mode of operation of this invention have been described in its preferred embodiment. However, it should be noted that this invention may be practiced otherwise than as specifically illustrated and described without departing from its spirit or scope.

What is claimed is:

1. A center bearing assembly adapted to rotatably support a rotatable shaft on a vehicle frame comprising:
   a rolling bearing adapted to rotatably support the rotatable shaft;
   a bracket adapted to be secured to a vehicle frame; and
   a support member supporting said roller bearing within said bracket, said support member including a bladder containing a rheological fluid.

2. The center bearing assembly defined in claim 1 further including means for selectively applying an energy field to said rheological fluid.

3. The center bearing assembly defined in claim 2 wherein said rheological fluid is a magneto-rheological fluid, and wherein said means for applying an energy field includes an electromagnet.

4. The center bearing assembly defined in claim 2 further including a sensor for sensing an operating condition of said vehicle, said means for selectively applying said energy field being connected to said sensor so as to vary said energy field in response to said operating condition.

5. The center bearing assembly defined in claim 4 wherein said sensor senses the radial displacement of said center bearing.

6. The center bearing assembly defined in claim 4 wherein said sensor senses the axial displacement of said center bearing.

7. The center bearing assembly defined in claim 4 wherein said sensor senses the radial acceleration of said center bearing.

8. The center bearing assembly defined in claim 4 wherein said sensor senses axial acceleration of said center bearing.

9. The center bearing assembly defined in claim 4 further including a shaft rotatably mounted within said center bearing, and wherein said sensor senses the angular displacement of said shaft.

10. The center bearing assembly defined in claim 1 further including a shaft rotatably mounted within said center bearing.

11. The center bearing assembly defined in claim 1 wherein said bladder is generally annular in shape.

12. A rotatable shaft and center bearing assembly adapted to rotatably mount the shaft to a vehicle frame, comprising:
    a rolling bearing;
    a shaft rotatably mounted within said roller bearing;
    a bracket adapted to be secured to a vehicle frame; and
    a support member supporting said roller bearing within said bracket, said support member including a bladder containing a rheological fluid.

13. The rotatable shaft and center bearing assembly defined in claim 12 further including means for selectively applying an energy field to said rheological fluid.

14. The rotatable shaft and center bearing assembly defined in claim 13 wherein said rheological fluid is a magneto-rheological fluid, and wherein said means for selectively applying said energy field includes an electromagnet.

15. The rotatable shaft and center bearing assembly defined in claim 13 further including a sensor for sensing an operating condition of said vehicle, said means for selectively applying said energy field being connected to said sensor so as to vary said energy field in response to said operating condition.

16. A vehicle comprising:
    a frame;
    a rolling bearing;
    a shaft rotatably mounted within said roller bearing;
    a bracket secured to said frame; and
    a support member supporting said roller bearing within said bracket, said support member including a bladder containing a rheological fluid.

17. The vehicle defined in claim 16 further including means for selectively applying an energy field to said rheological fluid.

18. The vehicle defined in claim 17 wherein said rheological fluid is a magneto-rheological fluid, and wherein said means for selectively applying said energy field includes an electromagnet.

19. The vehicle defined in claim 17 further including a sensor for sensing an operating condition of said vehicle, said means for selectively applying said energy field being connected to said sensor so as to vary said energy field in response to said operating condition.

\* \* \* \* \*